J. D. FETZER.
UNIVERSAL JOINT.
APPLICATION FILED FEB. 21, 1914.
1,128,432. Patented Feb. 16, 1915.
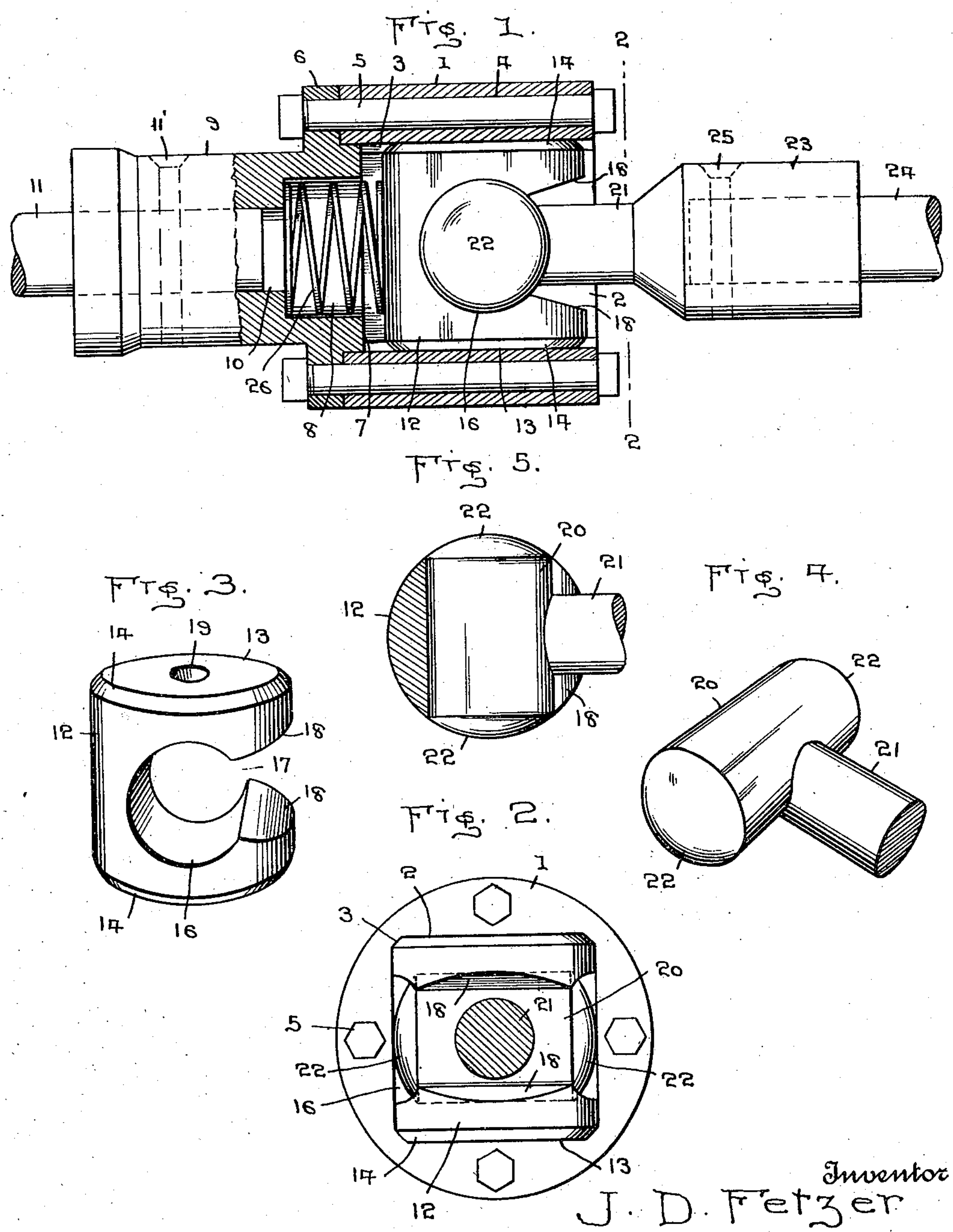
Inventor
J. D. Fetzer
Witnesses
Thos. W. Riley
J. H. Reid.
By W. T. Fitz Gerald & Co.
Attorneys

UNITED STATES PATENT OFFICE.

JAMES D. FETZER, OF COLUMBUS, OHIO.

UNIVERSAL JOINT.

1,128,432. Specification of Letters Patent. Patented Feb. 16, 1915.

Application filed February 21, 1914. Serial No. 820,213.

*To all whom it may concern:*

Be it known that I, the undersigned, JAMES D. FETZER, a citizen of the United States, residing at Columbus, in the county of Franklin and State of Ohio, have invented certain new and useful Improvements in Universal Joints; and I do hereby declare the following to be a full, clear, and exact description of the invention, such as will enable others skilled in the art to which it appertains to make and use the same.

This invention relates to universal joints and more particularly to that class of joints having bearing blocks interposed between the connecting parts, and has for one of its objects the provision of a joint wherein friction is reduced to a minimum.

A further object of this invention resides in the construction and arrangement of the connecting and wearing parts of the joint whereby the attainment of a greater latitude of angular direction of one of the shafts to the other is made possible. And a further object of this invention resides in the provision of a universal joint comprising few parts, simple in structure, efficient and durable in purpose, and which may be manufactured and sold at a nominal cost.

These and other objects will more fully appear and the nature of the invention more clearly understood by the construction, combination and arrangement of the parts thereof as described in the following specification, defined in the appended claims and illustrated in the accompanying drawing, in which, Figure 1 is a side view of the joint, partly in section, showing the interior of the same with the wearing and connecting parts assembled therein and in operative position. Fig. 2 is an end view of the joint taken on line 2—2 of Fig. 1 showing the diverging walls of the radial slot of one of the wearing parts and the position that the other of the wearing parts hold therewithin. Fig. 3 is a perspective view of the wearing block. Fig. 4 is a perspective view of the T-head for engaging the wearing block, and, Fig. 5 is a top view of the connecting parts, showing the wearing block partly in section and the T-head seated therein.

Like reference characters denote corresponding parts throughout the several views of the drawing, in which, 1 denotes the cylindrical casing provided with a rectangular bore 2 therethrough having the inclined corners 3, the casing 1 being further provided adjacent the periphery thereof with the apertures 4 through which pass the bolts 5 for retaining the shaft member 6 at one end of the casing 1. The shaft member 6 is provided at its inner face with the boss 7 of the rectangular contour of the bore 2 of the casing 1 for fitting snugly therein. The shaft member 6 being further provided at its inner end with the enlarged circular aperture 8. The shaft member 6 is also provided with the central bore 10 into which is securely held the shaft 11 through the medium of the bolt or other suitable fastening means 11′.

Slidably and rotatably mounted in the rectangular bore 2 within the casing 1 is the cylindrical wearing block 12 provided with the flat ends 13, the peripheral edges being cutaway to provide the circular oblique edges 14 at each end thereof. Extending diametrically through the block 12 is the bore 16 and extending radially outwardly toward the circumference of the block 12 is the slot-way 17, the opposite walls 18 of which diverge outwardly from the bore 16. In the ends 13 are the usual oil holes 19. Within the bore 16 of the block 12 is seated the T-head 20 of the shank 21, the shank 21 being positioned between the diverging walls 18 of the slotway 17 but normally out of contact therewith. The T-head 20 of the shank 21 is provided with the rounded ends 22. The shank 21 is further provided with the sleeve 23 into which is mounted the shaft 24 secured therein by any suitable securing means as shown by the bolts 25.

For resiliently mounting the wearing block and its connections within the casing 1, the spring 26 is interposed, one end of which is designed to bear against the block 12, the opposite end of the spring 26 being seated within the recess 8 of the shaft member 6 and bearing against the inner wall thereof. The flat ends 13 of the block 12 travel upon the faces of two of the opposing walls of the rectangular bore 2 within the casing 1, the oblique edges 14 of the block 12 engaging the oblique corners 3 of the rectangular bore 2 of the casing 1. The block 12 is not only slidably mounted within the casing 1 but the same is also mounted to rotate therein, this being due to the cylindrical exterior of the block 12, only a slight portion of the peripheral surface thereof engaging the adjacent walls of the rectangular bore 2. As a very limited surface of the block 12 engages the walls of the bore within the casing, friction is thereby reduced to practically a minimum.

Rotatably mounted within the bore 16 of the block 12 is the head 20 of the shank 21, this head being cylindrical in form and of a diameter slightly less than that of the bore wherein the head 20 may freely but not loosely rotate within the block 12, the ends of the block being rounded or semispherical. Only a very small surface of the ends 22 of the head 20 will engage the walls of the rectangular bore 2 and in this instance frictional contacts between these points are almost wholly obviated. By the provision of the slot way 17 connecting the bore 16 of the block 12 with the exterior, this slot-way provides for the reception of the shank 21 which is adapted not to contact with either of the walls 18 at each side of the slot-way 17, the walls 18 being diverged for the purpose of preventing contact with the shank 21 during the oscillatory movement of the same, thus providing for a greater latitude of angular direction between the two shafts.

Having thus fully described my invention what I claim as new and desire to secure by Letters Patent of the United States is:

1. A universal joint comprising; a casing having a rectangular bore therethrough, a cylindrical block slidably and rotatably mounted within said rectangular bore, said block having a diametrical bore therethrough, said block also having a slotway extending radially from said diametrical bore, a shank, and a cylindrical head upon said shank, said head being rotatably mounted within the bore of said block, said shank projecting through said slotway of said block.

2. A universal joint comprising; a casing having a rectangular bore therethrough, a cylindrical block slidably and rotatably mounted within said rectangular bore, said block having a diametrical bore therethrough, said block also having a slotway extending radially from said diametrical bore and provided with diverging walls, a shank, and a cylindrical head upon said shank, said head being rotatably mounted within the diametrical bore of said block, said shank projecting through said radial slotway of said block and out of contact with said diverging walls.

In testimony whereof I have signed my name to this specification in the presence of two subscribing witnesses.

JAMES D. FETZER.

Witnesses:

JOSEPHINE FETZER,
GRACE FETZER.